June 3, 1969 L. E. LUCE, JR 3,447,683
SEPARATION APPARATUS AND METHOD FOR MIXED IMPURITIES
ON THE EXPOSED SURFACE OF A LIQUID BODY
Filed May 15, 1967
Sheet 1 of 2
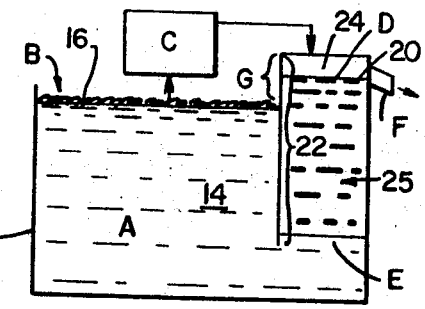
FIG_1
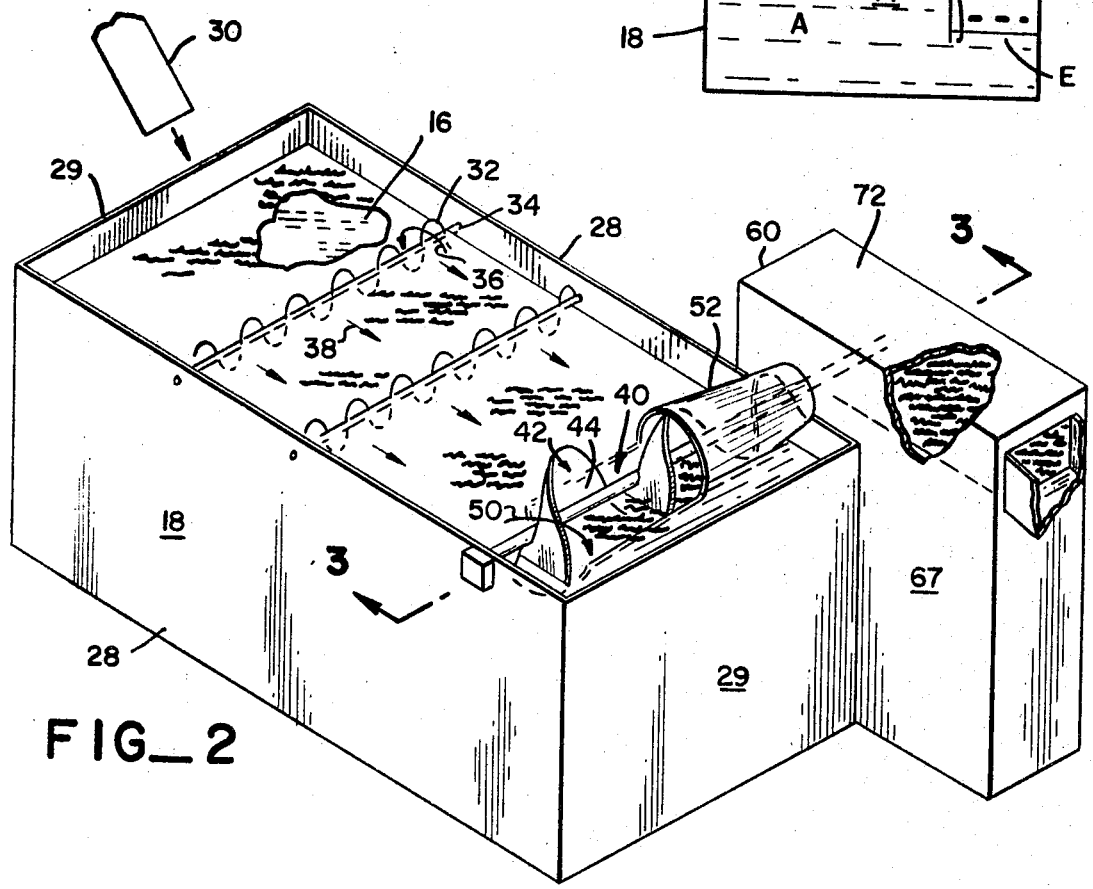
FIG_2
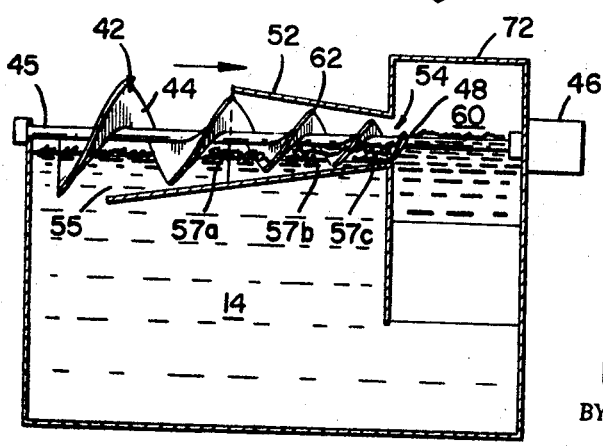
FIG_3
FIG_4
INVENTOR.
LAURENCE E. LUCE, JR.
BY
Townsend and Townsend
ATTORNEYS

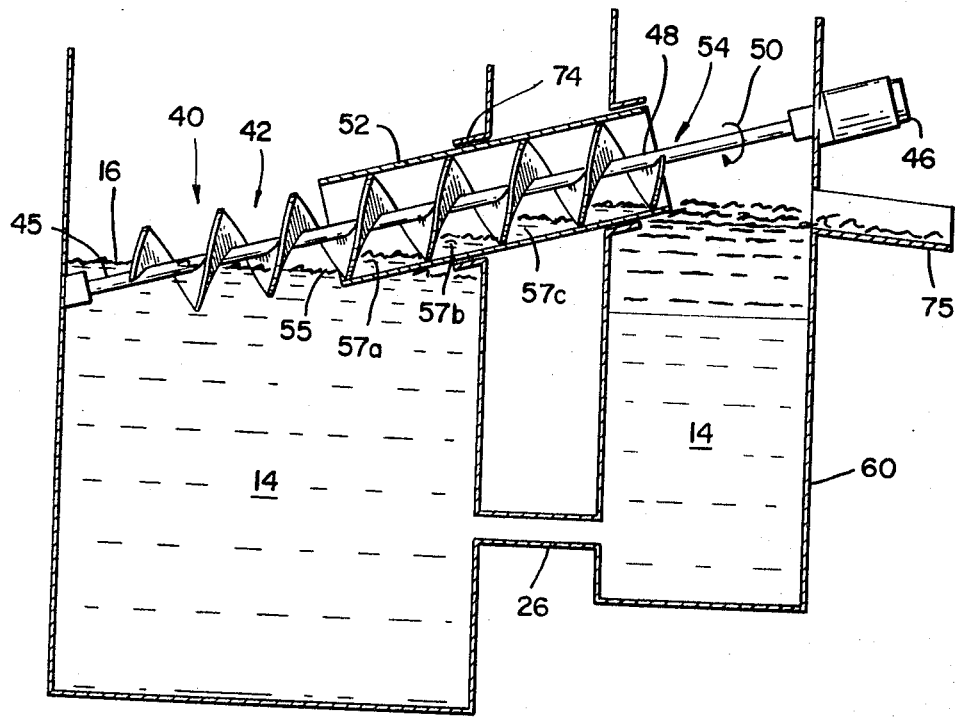
FIG_5

United States Patent Office 3,447,683
Patented June 3, 1969

3,447,683
SEPARATION APPARATUS AND METHOD FOR MIXED IMPURITIES ON THE EXPOSED SURFACE OF A LIQUID BODY
Laurence E. Luce, Jr., Berkeley, Calif., assignor to De Laval Turbine, Inc., Millbrae, Calif.
Filed May 15, 1967, Ser. No. 638,535
Int. Cl. B01d 21/14
U.S. Cl. 210—83                                 8 Claims

ABSTRACT OF THE DISCLOSURE

An apparatus and method for inducing or enhancing the settling separation of impurities floatably disposed and mixed with the ambient liquor of a liquid body. A settling sump having boundaries for the support of a fluid column of mixed impurities is supported at an elevation approximately that of the exposed surface of the body. The mixed impurities are removed from the exposed surface and discharged interior of the sump. In the sump the mixed impurities form a fluid column many times the thickness of the mixed impurities as originally floatably disposed, forming internal pressures in the column to promote settling separation of the ambient liquor of the liquid body from the impurities. The sump is fluidly communicated below the column of mixed impurities with the liquid body so as to return the separated liquor of the liquid body and permit the static head of the liquid bath to support the column of mixed impurities. After standing for settling separation, the impurities are discharged in a separated state from the sump.

---

This invention relates to an apparatus and method for inducing the settling separation of impurities of relatively light specific gravity floatably disposed on and mixed with a liquid body of relatively heavy specific gravity. Specifically set forth in this disclosure is a novel apparatus for skimming or decanting the top portion of the liquid body so as to substantially remove the mixed impurities for settling separation in cooperation with the disclosed method and apparatus.

Liquid bodies, such as lakes and bays of water or tanks of liquids, are commonly found with thin layers of extraneous materials or impurities floatably disposed along their surfaces. Such impurities typically comprise solid or liquid particles which has risen to or formed on the exposed surface of such liquid bodies in the form of scum. Alternately, such impurities may be permeated with gases forming a light frothy mass of material in the form of foam. Such materials mix and disperse with ambient liquor of the liquid bodies adjacent their exposed surfaces making simple removal of the impurities in a separated state free of the ambient liquor of the liquid body not possible. Ordinary techniques of skimming or decanting such liquid bodies often results in the loss of considerable amounts of such ambient liquors.

A specific example of such mixed and floatably disposed impurities is the contamination of "soluble oil" with "tramp oil" in an aluminum rolling mill. Typically aluminum when rolled is lubricated by means of specialized oil-water emulsions referred to generically as "soluble oils." Unfortunately, these soluble oils are frequently contaminated by various non-emulsified oils from the rolling machinery and other extraneous sources which when contacted with the rolled aluminum leave a undesired grease coating. These "tramp oils" floatably dispose on the surface of the soluble oil in a mixed state with considerable quantities of the soluble oil entrapped and entrained therein. Simple skimming or decanting removal of such tramp oils will necessarily involve extensive losses of the desired and relatively costly soluble oils.

Accordingly, an object of this invention is to set forth an apparatus for inducing settling separation of such mixed impurities to recover the ambient liquid of such liquid bodies. The disclosed apparatus contains a settling sump supported at an elevation approximately that of the exposed surface having boundaries for the support of a fluid column of mixed impurities interior thereof. The mixed impurities are removed from the exposed surface of the liquid body without substantially removing or disturbing the lower fluid layers. These impurities are deposited interior of the settling sump so as to form a fluid column. The column is maintained in elevation relative to the exposed surface by the fluid communication of the sump below the column which permits the static head of the liquid body to balance the equal and opposite static head of the column of mixed impurities. The column has a height which permits the static fluid pressures in its interior to induce settling separation of the ambient liquor from the mixed impurities. This separated ambient liquor passes through the bottom boundaries of the column and returns to the liquid body, while the separated impurities are discharged directly from the sump.

A further object of this invention is to disclose an apparatus for decanting mixed impurities from the exposed surface of a liquid body. According to this aspect of the present invention, a rotatably mounted auger having a helically configured face extending substantially the length thereof is rotated with respect to the exposed surface of a liquid body. The rotating auger is mounted so as to permit the helically configured face to penetrate the surface for impelling the mixed impurities along the face towards one end of the auger. A housing cooperates with the rotating auger to decant the mixed impurities. This housing has a discharge portion located at one extremity of the auger and an intake portion located medially along the auger which penetrates the exposed surface being decanted. This housing is mounted in proximity to the auger so as to form a sequential series of liquid containers in cooperation with the rotating helically configured face of the auger. The series of containers is sequentially formed as the auger rotates advancing the mixed impurities contained therein from the intake to the discharge of the housing permitting decanting of the exposed surface.

Other objects, features and advantages of the present invention will be more apparent after referring to the following specification and attached drawings in which:

FIG. 1 is a schematic diagram illustrating the fluid flow of the disclosed apparatus and the liquid;

FIG. 2 is a perspective view of a tank and attached decanting separation apparatus, specifically illustrating an auger decanting apparatus together with an adjacent settling chamber having a cap thereon;

FIG. 3 is a cross section of FIG. 2 taken along lines 3—3, illustrating specifically the construction of the novel auger decanting apparatus set forth in this disclosure;

FIG. 4 is a cross sectional detail setting forth the fluid seal between a stationary housing and the rotating auger; and, FIG. 5 illustrates a cross section of an alternate embodiment of the auger decanting apparatus according to this invention.

With specific reference to FIG. 1, liquid body A is illustrated having an exposed surface on which mixed impurities B are floatably disposed. Decanting apparatus C draws off mixed impurities B from their disposition on liquid body A and discharges these impurities interior of fluid settling column D. Column D fluidly communicates with liquid body A along return flow aperture E.

Inevitably, some portion of the liquid comprising liquid body A will be drawn interior of fluid settling column D. This liquid will have a specific gravity less than the substance of mixed impurities B, and therefore will settle and separate through the bottom of column D returning to liquid body A through aperture E. The remaining portion, comprising the substance of mixed impurities B will be discharged through outflow F, thus isolating and separating this substance from liquid body A.

It will be noted that the height of the mixed impurities in settling column D exceed the height of the exposed surface of liquid body A by a height differential G. Mixed impurities B have a specific gravity less than that of liquid body A permitting the original floating disposition of the mixture on the surface of the liquid body. Decanting apparatus C, by drawing off mixed impurities, concentrates this fluid of lower specific gravity into column D. Since the fluid pressure or static head at return aperture E exerted by liquid body A must be equal and opposing to that fluid pressure or static head exerted by column D, a higher column of the lighter mixed impurities B is required to equalize this pressure, resulting in height differential G.

Liquid body A comprises ambient liquor or liquid 14 having an exposed liquid surface 16. In the schematic of FIG. 1, liquid 14 is shown confined interior of a tank 18. Such confinement would be typically in commercial processes where separation of mixed impurities is desired. Liquid body A, however, can also comprise a large natural body of water, such as a bay or lake in which separation of surface contamination or mixed impurities is desired.

Mixed impurities B comprise materials which have a specific gravity less than that of liquid 16, which have risen to or formed on exposed surface 16. Examples of such mixed impurities include oil on water, tramp oil on soluble oil, liquid or solid impurities on fuel and the like.

Mixed impurities B will have as their substance 20 the matter or impurities from which they were formed. Additionally, this mixture will incorporate some portion of ambient liquor 14 of liquid body A. This latter incorporation is due to the entrainment and entrapment of portions of liquid body A interior of the mixture during the floating disposition of the mixed impurities on exposed surface 16.

Decanting apparatus C includes any apparatus which is suitable for removing, transferring or skimming mixed impurities B from exposed surface 16, without substantially disturbing or overly agitating the lower portion of liquid 14. Such apparatus commonly includes devices which mechanically remove the mixed impurities, such as rakes, paddle wheels and other conventional skimmers. Further, mixed impurities may be forced or pumped from the exposed surface by such means as jet pumps which direct a stream of fluid so as to entrap and entrain mixed impurities B or alternately a vacuum apparatus which entraps or entrains the mixed impurities along with other fluids flowing to a low pressure area.

Fluid settling column D accepts the discharge of decanting apparatus C and therefore consists of a concentration of mixed impurities B. As previously set forth, mixture B has a density less than that of ambient liquor A and therefore a height differential G above surface 16 of liquid body 14.

Column D has a depth 22 wherein settling separation of mixture B can readily occur. As is already apparent, the height of mixture B interior of column D exceeds by many times the height of mixed impurities B on liquid body A. This increase in height subjects the lower portions of mixture B in fluid column D to static fluid pressure which it did not experience in its original floating disposition on liquid 14. These pressures assists in the settling separation of the separate fluids substances comprising column D. Typically, any gasses will rise to the upper most portion of the column forming a top most fluid layer 24. Substance 20 of mixture B will form an intermediate fluid layer or layers 25 depending upon the miscible properties of its varied constituents. Finally, that portion of ambient liquor 14 which was entrapped with mixture B when it was decanted from exposed surface 16 will pass through the bottom boundary of column D returning to liquid body A through return flow aperture E. Fluid layers 24 and 25 may or may not be separated by distinct interfaces or boundaries. As is apparent, the formation of such interfaces or boundaries will depend largely upon the rate of fluid flow through the described apparatus and the miscible properties of the liquids being separated.

Return flow aperture E fluidly communicates bottom fluid layer 26 with liquid 14 in tank 18. This return flow aperture permits both the return of the separated ambient liquor 14 and permits the support of column D by means of the communicated static head of liquid body A. With specific reference to FIG. 1, aperture E is illustrated merely as a large opening in the bottom of column D. As is apparent, it may be desired to remove column D from tank 18. When such removal is affected, aperture E may be a pipe 26 which connects the fluid of body A to bottom fluid layer 25 of column D, as specifically illustrated in FIG. 5.

Outflow F is the fluid exit for substance 20 of mixture B. Typically, both layers 24 and 25 will escape through this outflow. As is apparent, if substance 20 of mixture B is composed of an immiscible substances which commonly separate into multiple fluid layers, additional outflows F may be placed at preselected elevational position along column D so as to obtain these varied separated components.

With reference to FIGS. 2, 3 and 4, a specific embodiment of the disclosed decanting separation apparatus is illustrated. A tank 18 having side walls 28 and end walls 29 is shown containing a liquid having exposed surface 16. On surface 16, mixed impurities B are floatably disposed. Liquid with the impurities entrained and entrapped therein flows into tank 18 through spout 30.

Medially located in tank 18 and disposed so as to penetrate exposed surface 16 are rotatably mounted paddles 32. These paddles 32 are shown affixed to axle 34 which is rotated in the direction of arrow 36 so as to cause the paddle surfaces to contact mixture B and propel the mixture in the direction of flow arrow 38.

Located at one end of tank 18 adjacent an end wall 29 is auger pump 40 which comprises a novel feature of this disclosure. An impellor or auger 42 having a helically configured face 44 extending substantially the length thereof is illustrated. Typically, the auger is affixedly to an axle 45 which in turn is rotated by apparatus such as a motor 46.

Helically configured face 44 is mounted with respect to exposed liquid surface 16 so as to penetrate the exposed surface for impelling mixed impurities B along its face toward auger end 48. As is apparent, when axle 45 is rotated by motor 46 in the direction of rotating arrow 50, mixture B will be trapped between wall 29, rotating face 44 and exposed liquid surface 16. Face 44 will slideably engage the mixed impurities on a continuous and advancing basis in cooperation with exposed liquid surface 16 propelling such mixed impurities interior of auger housing 52.

Housing 52 has discharge portion 54, an intake portion 55 at either end and is substantially symmetrical about rotating axle 45. Housing 52 between intake portion 55 and discharge portion 54 is in proximity to auger 42 so as to form a sequentially advancing series of liquid containers 57a, 57b and 57c in cooperation with helically configured face 44. When auger 42 rotates, containers 57 will advance with the liquids therein seeking the limits of the container defined by auger 42 and adjacent housing 52. Such rotation will impel mixed impurities from intake portion 55 to discharge portion 54 and consequently interior of settling chamber 60.

With specific reference to FIGS. 2 and 3, auger 42 and helically configured face 44 have been illustrated as suspended about rotating axle 45. As is apparent, auger 42 may be formed from a helically configured and solid member which does not need or require the structural reinforcement of attachment to an axle.

Helically configured face 44 may be any winding configuration suitable for impelling mixed impurities toward auger end 48 as auger 42 rotates. Auger periphery 62 may likewise be varied so as to fit any appropriate housing shape of housing 52 which is desired.

With specific reference to FIGS. 2 and 3, housing 52 is shown defining a portion of a cone with that portion of the housing corresponding to a section of the cone nearest the apex located at discharge portion 54, while that portion of the housing corresponding to the open end of the cone is located at intake portion 55. This conical configuration has an advantage not readily apparent.

As may be seen in the cross section in FIG. 3, the container 57a has a lower elevation when compared to the container 57b and similarly container 57b has a lower elevation than 57c. The axle 45 with its attached helically configured face is rotated about an axle which is horizontal. The containers, however, due to the conical restriction of the housing 52 and auger 42, elevate from exposed surface 16 thereby transporting the mixed impurities to an elevation where they may flow interior of sump 60.

It may be desired to provide a seal between auger periphery 62 and housing 52. With specific reference to FIG. 4, a flexible wiper 65 is shown attached to auger periphery 62 so as to slideably engage housing 52 during the rotation of the auger. The wiper, made from material such as rubber, plastic and the like, provides a substantially water tight seal for each of the advancing containers 57 by slideable engagement with housing 52.

Referring to FIG. 2, it will be noted that auger pump 40 was specifically located adjacent an end 29 of tank 18. As is apparent, auger pump 40 could be mounted at other locations on exposed surface 16 or alternately floatably suspended on the surface of a large body of water, such as a lake or bay, to accomplish its decanting function.

Settling sump 60 is shown with side walls 67 and end walls 68 extending substantially above tank 18. As has previously been described, chamber 60 contains a column of mixed impurities at a height whereby the static fluid pressures interior of the column assist in the settling separation of the mixed impurities B. Under many circumstances, it may be desired to restrict the fluid elevation of column D interior of sump 60, so as to encourage the outflow through aperture 70 and to increase the fluid pressure existing interior of the column. Accordingly, sump 60 may be constructed with top 72 thereon as shown in FIGS. 2 and 3.

With reference to FIG. 5, an alternate embodiment of auger pump 40 is specifically illustrated. Axle 45 is shown with an inclined position with respect to exposed surface 16, with that end adjacent liquid 14 being the low end of the axle and the opposite end shown rotatably mounted interior of chamber 60 being elevated. Housing 52 is shown cylindrical in shape and fixedly attached to auger periphery 62 so as to rotate with the entire auger assembly. This housing penetrates column 60 through seals 74 and terminates at discharge portion 54.

In operation, axle 45 is rotated in the direction of rotating arrow 50 by motor 46. As previously described, rotating helically configured face 44 impels mixture B in the direction of auger end 48. As auger 42 and housing 52 rotates, liquid is trapped between exposed surface 16, helically configured face 44 and housing 42 until a container 57a is defined.

It will be noted that intake portion 55 is submerged so as to trap a portion of the ambient liquor 14. This liquid 14 floatably disposes along the bottom portions of continuously and sequentially advancing containers 57a, 57b and 57c so as to prevent the mixed impurities from merely rotating with auger 40 and attached housing 52 thus slideably advancing mixture B along the defined liquid containers.

The inclination of axle permits auger pump 40 to discharge the mixed impurities at a substantially higher level than that of exposed surface 16 of liquid 14 transporting the mixed impurities to the top portion of column D for settling separation.

FIG. 5 further illustrates the use of a weir 75 for the discharge of the impurities at the top portion of column D. Auger pump 40 will pump mixed impurities B interior of column D at a rate permitting settling separation of the ambient liquor 14 from the mixture. As has been previously explained, the top portion of column D will rise in relation to exposed surface 16. Weir 75 is placed at a preselected elevation on settling sump 60 so as to drain off the mixed impurities when they rise to the level of its outflow. The elevated position of weir 75 assures the selection of impurities having the lightest specific gravity and therefore selectively discharges such impurities having a minimum of ambient liquor 14 of relatively heavy specific gravity entrapped and entrained therein.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An apparatus for inducing settling separation of mixed impurities floatably disposed on the exposed surface of a liquid body from the ambient liquor of said liquid body, said apparatus comprising: a tank containing said liquid body and exposing a liquid surface thereof; a settling sump having a depth permitting fluid pressures in a column therein of mixed impurities to induce settling separation of said ambient liquor of said bath from said mixed impurities; means for fluidly communicating said tank and said sump for returning separated ambient liquor to said liquid body and transmitting the static head of said liquid body to balance the static head of said column; means for continuously inflowing mixed impurities from said liquid body to said sump; means for continuously outflowing classified impurities from said sump from a preselected elevation above the surface of said liquid body whereby said column of mixed impurities is continuously maintained at a height for forming static fluid pressures interior of said column for promoting settling separation.

2. The invention of claim 1 and wherein said means for continuously inflowing comprises a positive displacement pump for decanting the ambient liquor of said liquid body and said floatably disposed mixed impurities.

3. The apparatus of claim 2 and wherein said positive displacement pump comprises an auger pump.

4. The invention of claim 1 and wherein said means for continuous inflowing is disposed adjacent said exposed surface of said liquid body at a first point; and, said tank includes means for propelling said mixed impurities along said exposed surface to said first point.

5. The invention of claim 1 and wherein a top is provided on said settling sump for increasing fluid pressures for separation of gaseous components from said mixed impurities.

6. A process for inducing settling separation of mixed impurities floatably disposed on the surface of a liquid body from the ambient liquor of said body, said process comprising the steps of: providing a settling sump having side boundaries for the support of a vertical column of said mixed impurities interior thereof, said column having a height permitting static fluid pressures interior of said column to promote settling separation of said liquor of said body from said impurities; maintaining said sump and said liquid body in fluid communication at an elevation relative to one another so as to balance the static head of said column against the static head of said liquid body; continuously decanting said mixed impurities from said exposed surface into said fluid column; continuously outflowing classified impurities from said fluid column at a rate which at all times maintains said column of mixed impurities at a height sufficient to form static fluid pressures for positively inducing settling separation through the bottom boundary of said column.

7. The process of claim 6 including the additional step of pressurizing said fluid column interior of said sump for enhancing said settling separation of gaseous components from said mixed impurities.

8. An apparatus for inducing settling separation of mixed impurities floatably disposed on the exposed surface of a liquid body from the ambient liquor of said body; said apparatus comprising: a tank containing said liquid body and exposing a liquid surface thereof; a settling sump adjoined to said tank having a depth extending above and below the surface of said liquid body; said settling sump having an overall vertical dimension for supporting a column therein of mixed impurities to produce fluid pressures for positively inducing settling separation of said ambient liquors from said mixed impurities; said settling sump in unrestricted fluid communication with said tank from the bottom portion thereof for returning separated ambient liquor to said liquid body and transmitting the static head of said liquid body to balance the static head of said column; a conically tapered auger pump for continuously inflowing mixed impurities from said liquid body to said sump; the intake of said auger pump being located away from the apex of said conical taper and decanting said liquid body over a relatively large surface; the outflow of said auger pump being located adjacent the apex of said conical taper and having a decreasing area for condensing and elevating said mixed impurities; weir means for continuously outflowing classified impurities from the top portion of said sump whereby a column of mixed impurities is maintained within said sump at a height sufficient to induce pressures for enhancing the settling separation of said impurities.

References Cited

UNITED STATES PATENTS

| | | | |
|---|---|---|---|
| 1,529,750 | 3/1925 | Plate | 198—213 X |
| 1,618,338 | 2/1927 | Hoffman | 198—215 X |
| 1,648,607 | 11/1927 | Brown | 210—522 X |
| 2,142,206 | 1/1939 | Patek | 209—168 |
| 2,235,052 | 3/1941 | Trier | 198—213 X |
| 2,592,983 | 4/1952 | Hildebrandt | 210—261 X |
| 3,314,540 | 4/1967 | Lane. | |
| 3,339,345 | 9/1967 | Sebald et al | 55—178 |

REUBEN FRIEDMAN, Primary Examiner.

J. ADEE, Assistant Examiner.

U.S. Cl. X.R.

210—197, 256, 540